United States Patent [19]

Yagita et al.

[11] Patent Number: 4,705,632

[45] Date of Patent: Nov. 10, 1987

[54] HOLLOW FIBER MEMBRANE FORMED FROM A BLOCK COPOLYMER OF AROMATIC POLYESTER AND POLYOXYETHYLENE FOR DIALYSIS OF BLOOD

[75] Inventors: Koji Yagita; Yotsuo Ono, both of Oita, Japan

[73] Assignee: Asahi Medical Co., Ltd., Tokyo, Japan

[21] Appl. No.: 843,819

[22] Filed: Mar. 28, 1986

Related U.S. Application Data

[63] Continuation of Ser. No. 660,036, Oct. 12, 1984, abandoned.

[51] Int. Cl.$^4$ .............................................. B01D 13/01
[52] U.S. Cl. ........................... 210/500.23; 210/500.27; 210/500.28; 210/500.33; 210/500.36
[58] Field of Search ...................... 210/500.23, 500.27, 210/500.28, 500.33, 500.36; 204/296

[56] References Cited

U.S. PATENT DOCUMENTS 4,430,219 2/1984 Kuzumoto et al. .............. 210/321.3
4,454,309 6/1984 Gould et al. ........................ 525/454

FOREIGN PATENT DOCUMENTS 0006030 12/1979 European Pat. Off. .

OTHER PUBLICATIONS

*The Condensed Chemical Dictionary,* 10th Edition, Van Nostrand Reinhold Co., 1981, pp. 839-840.
D. J. Lyman et al., Biochemistry, vol. 3, No. 7, pp. 985-990, Jul. 1964.
Modern Plastics Encyclopedia, vol. 48: No. 10A, pp. 549-568 and 622-626, Oct. 1971.
Biomaterial Science, vol. 2, pp. 63-69, Oct., (1982).
L. Hudson and F. C. Hay, Practical Immunology, 2nd Ed., pp. 142-145, Oct., (1980).

*Primary Examiner*—Richard V. Fisher
*Assistant Examiner*—Jeffrey W. Peterson
*Attorney, Agent, or Firm*—Finnegan, Henderson, Farabow, Garrett & Dunner

[57] ABSTRACT

A hollow fiber membrane for the dialysis of blood is formed by melt-spinning a block copolymer which has a reduced viscosity of 1.5 to 4.0 and is comprised of 30 to 60% by weight of an aromatic polyester having a water absorption up to 1% by weight and 40 to 70% by weight of polyoxyethylene or its derivative having a number average molecular weight of 3000 to 20000.

6 Claims, No Drawings

HOLLOW FIBER MEMBRANE FORMED FROM A BLOCK COPOLYMER OF AROMATIC POLYESTER AND POLYOXYETHYLENE FOR DIALYSIS OF BLOOD

This application is a continuation, of application Ser. No. 660,036, filed Oct. 12, 1984, abandoned.

BACKGROUND OF THE INVENTION (1) Field of the Invention

The present invention relates to a hollow fiber membrane for the dialysis of blood, having a highly-improved function of removing solutes and a good compatibility with blood.

(2) Description of the Prior Art

At the present, hollow cellulosic fibers for the dialysis of blood are widely used as dialysis membranes for an artificial kidney. An artificial dialyzer comprising this membrane gives an appropriate ultrafiltration rate and a high clearance of low-molecular-weight substances, and functions excellently to prolong the life of a patient. However, developments in medical techniques have made it desirable to provide a high-performance membrane which exerts not only the life-prolonging effect but also an effect of making it possible for a patient to live and work in society in the same way as a healthy man, when the patient does not receive dialytic treatment. More specifically, removal of not only low-molecular-weight substances but also middle-molecular-weight and high-molecular-weight substances is now desired, and researches are being carried out to develop dialysis membranes capable of sufficiently removing middle-molecular-weight and high-molecular-weight substances in a short time without causing an unpleasant feeling in a patient.

From the hematological viewpoint, in conventional membranes, an immunological disorder such as activation of the complement or temporary decrease of leukocytes is regarded as a problem, and in order to prevent coagulaton of blood at the dialysis, it is necessary to use a considerable amount of an anti-coagulant, which sometimes gives an unfavorable side effect. Accordingly, development of a membrane not causing these biochemical troubles is strongly desired.

As means for overcoming the defects of the conventional membranes, there has been proposed a membrane prepared by a wet phase-inversion process using a synthetic polymer. According to the principle of this wet process, the permeability to substances to be removed is not manifested by the molecular structure of the synthetic polymer used but by a secondary structure formed according to appropriate membrane-forming conditions. Namely, the permeability is manifested by exposing a solution of the synthetic polymer dissolved in a solvent to a nonsolvent for the synthetic polymer while controlling the state of precipitation of the synthetic polymer by the composition of the solvent, the temperature, and the composition of the nonsolvent. In the membrane prepared according to the wet phase-inversion process, voids among the precipitated particles of the synthetic polymer act as passages for substances to be removed, whereby the permeability is manifested.

As the membrane of this type, there have been proposed a polyacrylonitrile membrane, a polysulfone membrane, a polymethyl methacrylate membrane, and a polycarbonate-polyethylene glycol membrane. Because of the membrane-forming principle, the ultrafiltration rate in these membranes is too high, and therefore, a special apparatus (UFR controller) for controlling the amount of water to be removed must be used at the dialysis and the operation becomes complicated. A polycarbonate-polyethylene glycol membrane in which the polyethylene glycol content is about 30% by weight, so as to lower the ultrafiltration rate by rendering the membrane hydrophilic, is proposed. Where a high polymer is rendered hydrophilic, when the polymer is exposed to a nonsolvent therefor and the formed membrane is dried by air drying or the like, the membrane is drastically shrunk and the permeability is extremely reduced. Accordingly, it is not permissible to dry the membrane according to customary procedures.

Furthermore, even when a seemingly dry product is obtained by using a wetting agent such as glycerol, if it is allowed to stand for a long time, the size and dialytic activity are changed with the lapse of time and hence, the membrane cannot be regarded as being appropriate as a membrane for the dialysis of blood. Moreover, even when membranes are prepared from the foregoing polymers including the above-mentioned copolymer having a low polyethylene glycol content, as is apparent from the micro-phase-separation-conformation thereof, no practical permeability can be manifested. Still further, since the permeability is controlled according to membrane-preparing conditions, the control must be performed very carefully, and since a solvent is used, a treatment is necessary for removal of the solvent after the formation of a membrane. In short, the membraneforming process is very complicated. In addition, almost all membranes prepared according to the conventional techniques are unoriented membranes consisting of aggregates of particles, and therefore, the mechanical strength is ordinarily poor and there is a risk of the leakage of blood at the blood treatment. A solvent capable of dissolving a synthetic polymer therein has a good compatibility with the synthetic polymer. Therefore, even if the solvent-removing treatment is carried out, it is very difficult to completely expel the residual solvent, and a satisfactory membrane for the dialysis of blood cannot be obtained. From the hematological viewpoint, a polyacrylonitrile membrane, a polysulfone membrane, and a polymethyl methacrylate membrane exert effects of moderating the activation of the complement and the temporary decrease of leukocytes. However, adverse influences to the living body, such as the adhesion of platelets to the membrane, are sometimes caused. Accordingly, these membranes are not hematologically satisfactory.

As means for overcoming the defects of the conventional membranes, there has been proposed a process for preparing a membrane for the dialysis of blood according to the melt membrane-forming method from a poly-ε-caprolactam-polyalkylene ether-polyacyl lactam block terpolymer having poly-ε-caprolactam blocks and polyalkylene ether blocks (European Patent Publication No. 6030). However, it is not proved that this poly-εcaprolactam-polyalkylene ether-polyacyl lactam block terpolymer sufficiently eliminates the defects of the conventional membranes. This block terpolymer is formed by connecting 35 to 65% of the polyalkylene ether component with acyl lactam and can be regarded as a block copolymer of poly-ε-caprolactam (nylon 6) and polyalkylene ether. Each of the components of this copolymer has a water absorption of at least 1% and is hydrophilic. Accordingly, a membrane prepared from this block copolymer is highly hydrophilic and, if the polyalkylene ether content is increased to improve the dialyzability, the wet mechanical properties of the membrane in water or an aqueous solution such as blood are lower than those of a membrane prepared by using a hydrophobic component as one component.

When this block copolymer is melt-spun, the copolymer is treated at a temperature sufficient to melt the copolymer. It is predicted that low-molecular-weight nitrogen-containing compounds will be generated by oxidative degradation or thermal degradation of the copolymer at this treatment. If this membrane is used for a blood treatment, such as dialysis, it is thought that these low-molecular-weight nitrogen-containing compounds will have an adverse affect on the living body. Moreover, this block copolymer is not sufficiently improved with respect to the immunological disorder, that is, the activation of the complement. Accordingly, the membrane of this copolymer cannot be regarded as being satisfactory as a blood treatment membrane.

As is apparent from the data of sample E in Examples III and IV in European Patent Publication No. 6030, the membrane prepared according to the solution-casting process is different from the membrane prepared according to the melt-spinning process in the solute permeability, and the latter membrane has a much lower solute permeability. Namely, the permeability to urea is reduced to about ½ and the permeability to vitamin B-12, which is a typical instance of the middlemolecular-weight or high-molecular-weight substance, is reduced to about 1/5. When an oriented membrane is obtained by drafting or drawing an ordinary synthetic high polymer at a temperature higher than the heat distortion temperature, the above tendency is ordinarily observed. Where all the components of a block copolymer are hydrophilic, because of the good compatibility among the block segments, during the course of from the melted state to the solidification by cooling, advance of the phase separation necessary for manifestation of the solute permeability is delayed as compared where one component of the block copolymer is hydrophobic. Thus, it is expected that a domain conformation will be finally formed. It is believed that this promotes the above-mentioned tendency.

D.J. Lyman et al have proposed in Biochemistry, Vol. 3, No. 7, July 1964 a solution-casting process for forming a membrane for the dialysis of blood, in which a polyethylene terephthalate-polyethylene glycol block copolymer comprising a polyethylene glycol having a low molecular weight of 600 to 4000, which is included in the block copolymer comprising an aromatic polyester and polyoxyethylene, used in the present invention, is dissolved in dichloromethane at a copolymer concentration of 15 to 20% by weight, the solution is cast on a glass sheet and air-dried, the glass sheet is put into water and the formed membrane is peeled from the glass sheet. It is set forth in this reference that the correlation between the composition of the block copolymer and the dialyzability depends upon not the molecular weight of the polyethylene glycol but the content thereof. According to the solution-casting membrane-forming process, because of the solubility of the copolymer with the solvent, it is very difficult to completely remove the residual solvent, and the formed membrane is not satisfactory as a blood-treating membrane.

In order to moderate the burden on a patient at the step of circulation of blood outside the body, it is necessary to reduce the quantity of blood to be taken from the body to a level as low as possible. A suggestion of the use of hollow fibers effective for this purpose is not found in the proposal of Lyman et al. Moreover, the formation of hollow fibers according to the solution-casting membrane-forming process is very difficult, and additional steps such as the step of recovering the used solvent become necessary and the manufacturing cost will be increased. A membrane prepared according to the solution-casting membrane-forming process is substantially unoriented and the block copolymer obtained according to the teaching of Lyman et al has a reduced viscosity lower than 1.5. Accordingly, this membrane does not have sufficient strength enough to show the good bursting resistance required for a membrane of a blood dialyzator, especially a flat membrane.

SUMMARY OF THE INVENTION

In accordance with the fundamental aspect of the present invention, there is provided a hollow fiber membrane for the dialysis of blood, which is formed by melt-spinning a block copolymer having a reduced viscosity of 1.5 to 4.0, the block copolymer comprising 30 to 60% by weight of an aromatic polyester having a water absorption up to 1% by weight and 40 to 70% by weight of polyoxyethylene or its derivative having a number average molecular weight of 3000 to 20000.

DETAILED DESCRIPTION OF THE PREFERRED EMBODIMENTS

The water absorption referred to in the instant specification and appended claims is one determined according to the method of ASTM D-570. Data of the water absorption determined according to this method on various synthetic polymers is shown in Modern Plastics Encyclopedia, 48 (10A), 1971/1972.

By using segments of a highly hydrophobic aromatic polyester having a water absorption up to 1%, it is possible to obtain a hollow fiber membrane having a strength sufficient to act as a structural support even under wet conditions such as those adopted for the dialysis of blood. When highly hydrophobic segments having a water absorption up to 1% are copolymerized with hydrophilic segments, phase separation under cooling, indispensable for the manifestation of the solute permeability, is brought about.

Furthermore, when an aromatic polyester which is a condensation type polymer is used as the highly hydrophobic polymer, the obtained block copolymer has good mechanical properties and a good heat resistance, and therefore, hollow fibers obtained by melt-spinning this block copolymer can be subjected to steam-autoclaving sterilization and the conventional sterilization step using an ethylene oxide gas can be omitted. An increase of acidophilic leucocytes or a side effects such as an allergic reaction occurring due to residual ethylene oxide can be prevented completely.

The aromatic polyester is a rigid linear polymer, and if segments of a highly hydrophilic polymer having a high molecular weight are copolymerized with segments of this aromatic copolyester, and the recurring unit length of the polyester is increased, then the rigidity of the obtained block copolymer is enhanced and spinning is facilitated.

The aromatic polyester having a water absorption up to 1% by weight, as used in the present invention, is a polyester in which the glycol component is a dihydric alcohol having 2 to 6 carbon atoms and the dibasic acid component is an aromatic dibasic acid. As preferred examples of the dihydric alcohol, there can be mentioned ethylene glycol, propylene glycol, tetramethylene glycol, neopentyl glycol, and hexamethylene glycol. As preferred examples of the aromatic dibasic acid, there can be mentioned isophthalic acid, phthalic acid, terephthalic acid, diphenyl-p,p'-dicarboxylic acid, and 1,2-diphenoxyethane-p,p'-dicarboxylic acid. There may be also formed the highly hydrophobic aromatic polyester having a water absorption up to 1% by weight of the present invention by using as the aromatic polyesterforming component two or more glycol components or dibasic acid components, or a carbonic acid ester of bisphenol A. When the crystallinity, physical strengths, heat resistance, and manufacturing cost are collectively taken into consideration in addition to the hydrophobic property, a combination of ethylene glycol and terephthalic acid (polyethylene terephthalate) and a combination of tetramethylene glycol and terephthalic acid (polybutylene terephthalate) are most preferred.

In the block copolymer of the present invention, segments of the aromatic polyester having a water absorption up to 1% by weight are effective for maintaining the shape and structure of the membrane in the wet state and improving the physical characteristics. Segments of polyoxyethylene or its derivative are sufficiently swollen with blood at the time of dialysis and provide flow passages for the solutes and water among the polymer molecules. The polyoxyethylene or its derivative used in the present invention is water-soluble or is highly hydrophilic and has a water absorption of at least 100% by weight. As preferred examples of the polyoxyethylene or its derivative, there can be mentioned polyoxylethylene glycol, polyoxyethylene diamine, polyoxyethylene dicarboxylic acid, and derivatives thereof in which parts of ethylene chains are substituted by propylene or tetramethylene. Highly hydrophilic polyoxyethylene glycol which is nontoxic or has as little toxicity as possible, is not irritative or causes as little irritation as possible to the immunological system, and is water-soluble is especially preferred.

When a block copolymer comprising segments of a highly hydrophobic aromatic polyester having a water absorption up to 1% by weight and segments of highly hydrophilic polyoxyethylene is used, formation of the phase separation conformation is promoted as compared with a block copolymer comprising segments of highly hydrophilic polymers having a good compatibility with each other at the melt-spinning step and during the membrane-forming process comprising the steps of melting, extrusion, and cooling for solidification. Accordingly, the solute permeability of the membrane is increased and the obtained hollow fiber membrane is very valuable as the dialytic membrane.

As the result of research, it now has been found that as the number average molecular weight of the polyoxyethylene or its derivative increases, the recurring unit length of segments of the aromatic polyester to be combined with segments of the polyoxyethylene or its derivative is increased to improve the hydrophobic characteristic and rigidity, facilitate formation of the membrane, and enhance the strength of the membrane, and coarse domains showing a large phase separation conformation at the melting and solidifying steps are formed, with the result that a hollow fiber membrane having a high dialyzing activity can be obtained. More specifically, it has been found that when polyoxyethylene or its derivative having a high molecular weight is used for copolymerization with an aromatic polyester, a good compatibility is attained under heating and a good phase separation is caused under cooling. This characteristic of causing phase separation under cooling results in manifestation of the solute permeability in the block copolymer of the aromatic polyester and polyoxyethylene or its derivative, and as explained on pages 63 through 69 of Biomaterial Science, Volume 2, New Development of Medical functional Materials (1982), the biological unreactivity due to formation of microdomains is caused.

The recurring unit length of the aromatic polyester segments optionally can be changed by varying the molecular weight of the polyoxyethylene or its derivative. In other words, the domain structure optionally can be changed. However, if the polyoxyethylene or its derivative has too high a molecular weight, the copolymerization becomes difficult, the conversion is not increased, and the yield is low. Furthermore, phase separation is likely to occur even in the hot state. Accordingly, the use of polyoxyethylene or its derivative having too high a molecular weight is not preferred. If the molecular weight is lower than 3000, the recurring unit length of the aromatic polyester segments is short and the solidification rate of the copolymer as a whole is slow. Accordingly, the adhesion of fibers to one another occurs and spinning becomes difficult, and the permeability of the obtained membrane is low because of its low phase separation rate upon cooling. It is preferred that the number average molecular weight of the polyoxyethylene or its derivative be in the range of from 3000 to 20000, especially from 5000 to 10000. By the term "number average molecular weight" used herein is meant that which is calculated from the hydroxyl value measured by a conventional procedure.

In view of the solute permeability, it is preferred that the content of the polyoxyethylene or its derivative in the block copolymer be high. However, if this content is too high, swelling of the membrane with an aqueous solution becomes extremely large and the mechanical strengths of the membrane is reduced, and the obtained membrane is of no practical use. In contrast, if the content of the polyoxyethylene or its derivative is too low, the hydrophobic aromatic polyester segments are likely to form a continuous phase and the solute permeability is reduced. In view of the foregoing, it is preferred that the content of the polyoxyethylene or its derivative based on the whole copolymer be in the range of from 40 to 70% by weight, especially from 45 to 65% by weight.

The present invention is characterized in that a hollow fiber membrane is formed by melt-spinning the above-mentioned block copolymer comprised of the aromatic polyester and polyoxyethylene or its derivative. Since the hollow fiber membrane formed by melt-spinning this block copolymer has a micro-domain structure, almost no activation of the complement is caused and it is therefore considered that temporary reduction of leucocytes will be prevented. Moreover, since adhesion of platelets to the membrane surface is reduced, the membrane is excellent in the resistance to coagulation of blood. Where blood is circulated outside the body by using the module for the dialysis of blood fabricated by using this hollow fiber membrane, the amount administered of an anti-coagulant such as heparin can be decreased.

Membranes obtained by heat-melting and shaping synthetic polymers heretofore used, such as polyacrylonitrile, polymethyl methacrylate, polysulfone, and polycarbonate-polyethylene glycol with a low PEG content, have little or no solute permeability as is apparent from the molecular structures thereof. In contrast, if the above block copolymer of the present invention is melt-spun, a good compatibility is attained under heating and phase separation is caused under cooling whereby a micro-domain structure is formed and a good solute permeability is manifested. The melt-spinning method adopted in the present invention is a very simple method in which the block copolymer is heated at a temperature of at least the melting point of the block copolymer, the melt is extruded in the form of a hollow fiber through a spinneret by an ordinary extruder, the extrudate is cooled to be thereby solidified and the formed hollow fiber is wound on a bobbin or the like. Accordingly, this melt-spinning method is advantageous over other spinning methods, such as the wet spinning method, in that the operation steps are simplified and products having a good quality can be provided stably at a low cost. Furthermore, the hollow fiber membrane prepared by melting the copolymer and solidifying the melt has a structure quite different from that of the membrane formed by the conventional wet-phase inversion method, which consists of aggregates of precipitated polymer particles, and this hollow fiber membrane is a uniform membrane where spaces such as voids are not present and is characterized by very high mechanical strengths. These high strengths can be further improved by the adoption of such means as drawing or drafting at the spinning operation. Furthermore, the risk of the presence of a residual solvent, which cannot be avoided in the wet membrane-forming process or the solution-casting membrane-forming method, can be eliminated completely according to the melt-spinning method of the present invention. In addition, this meltspinning method is very suitable for the production of a blood-treating membrane.

The hollow fiber for dialysis of blood according to the present invention is prepared according to the following procedures. The aromatic polyester-polyoxyethylene block copolymer is melted and extruded through a spinneret having orifices and tubes built therein. In order to form a hollow space in the extrudate, natural suction is effected in the internal tubes or air or an inert gas is supplied under an appropriate pressure through the internal tubes. The thus-obtained hollow fiber membrane is cooled to an appropriate temperature, for advancing the crystallization a solidification sufficiently by a gas such as air or nitrogen or a liquid having no reactivity with the block copolymer, such as water, glycerol, silicone oil or polyethylene glycol, and the membrane is wound on a bobbin or other support to form a product. The ratio of the speed of winding the membrane after cooling to the speed of extrusion of the melt from the spinneret is adjusted so that preferred orientation is given to the obtained hollow fiber membrane.

In order to make the above-mentioned melt-spinning possible, it is necessary that the viscosity of the aromatic polyester-polyoxyethylene block copolymer should be increased by increasing the molecular weight at the polymerization step. More specifically, it is preferred that the reduced viscosity of the block copolymer be in the range of from 1.5 to 4.0. If the reduced viscosity is lower than 1.5, the melt viscosity at the time of extrusion is too low and it is very difficult to form and maintain a hollow fiber structure. If the reduced viscosity is higher than 4.0, the fiber forming property is poor, and even if the fiber forming property is increased by reducing the melt viscosity by elevating the spinning temperature, there is a risk that discoloration or degradation of block copolymer will occur. The molecular weight giving the reduced viscosity within the above-mentioned range is much higher than the reduced viscosity obtained under ordinary polymerization conditions. Accordingly, where it is difficult to increase the reduced viscosity, it is preferred that prolongation of the polymerization time, adoption of the solid phase polymerization technique, and use of a polymer branching agent such as pentaerythritol be employed at the polymerization step.

The reduced viscosity referred to in the instant specification and appended claims is determined by dissolving 0.2 g of the polymer in 50 ml of a 50:50 mixture of 1,1,2,2-tetrachloroethane and phenol at 90° C., measuring the flow-down time by using an Ostwald viscometer at 30° C., and calculating the reduced viscosity according to the following formula:

$$\eta_{sp/c} \text{ (reduced viscosity)} = \left( \frac{\text{measured seconds}}{\text{seconds of blank}} - 1 \right) \times \frac{1}{\text{concentration (g/100 ml)}}$$

The standard of the Ostwald viscometer used in such that the flow-down time of water at 35° C. is 45±5 seconds when the amount of water is 10 ml.

From the practical viewpoint, it is preferred that the thickness and inner diameter of the hollow fiber membrane be 5 to 100 μm and 150 to 500 μm, respectively. These dimensional factors are appropriately determined according to the intended use.

The main use of the hollow fiber membrane of the present invention is a blood treatment, though the hollow fiber membrane of the present invention can be used as a water-treating filter or the like in various industrial fields. The hollow fiber membrane of the present invention is especially suitably used as a hollow fiber for the dialysis of blood.

The present invention will now be described in detail with reference to the following examples that by no means limit the scope of the invention.

EXAMPLE 1

(a) Preparation of Block Copolymers

Block copolymers comprised of polybutylene terephathalate having a water absorption of 0.08% by weight, as the hydrophobic polymer component and polyoxyethylene glycol as the hydrophilic polymer component were formed from dimethyl terephthalate, 1,4-butane diol and polyoxyethylene glycol according to the customary ester exchange polymerization method, except that the polymerization time was prolonged to increase the viscosity of the formed copolymer. Various polyoxyethylene glycols differing in the molecular weight were used as the hydrophilic polymer component, and the weight ratio of polybutylene terephthalate/polyoxyethylene glycol was 40/60.

(b) Formation of Membranes

Each block copolymer melted and extruded through a spinneret having orifices and tubes built therein while nitrogen was supplied into the internal tubes, and the extrudate was cooled by air maintained at room temperature. The thus-formed hollow fiber was wound at a speed of 500 m/min on a bobbin to obtain a hollow fiber membrane. The draft value adopted at the spinning step was 3500.

(c) Permeability

The removal ratios of urea (molecular weight 60) and vitamin B-12 (molecular weight 1355) were measured. The number of the hollow fibers was adjusted so that the membrane area based on the inner diameter was 100 cm$^2$ at an exposed portion length of 18 cm. The ends of the hollow fibers were gathered together and fixed with an epoxy resin. The gathered fibers were cut at the middle part of the resin-applied portion to obtain a hollow fiber membrane module opened at one end. This module was used for the test. A mixed aqueous solution containing 100 mg/dl of urea and 10 mg/dl of vitamin B-12 was supplied at a rate of 2 ml/min into the module immersed in a large quantity of water stirred and maintained at 37° C. to effect dialysis. The outlet liquid was sampled and the concentration of the solutes was measured by the spectrophotometric method. The removal ratios were determined by dividing the difference of the solute concentration between the outlet liquid and the inlet liquid by the solute concentration in the inlet liquid. The test results are shown in Table 1.

TABLE 1

| Sample No. | Molecular Weight of Polyoxyethylene Glycol | Reduced Viscosity, $\eta_{sp/c}$ | Thickness (μm) | Inner Diameter (μm) | Urea Removal Ratio (%) | Vitamin B-12 Removal Ratio (%) |
|---|---|---|---|---|---|---|
| 1 | 3100 | 1.95 | 36 | 172 | 62 | 1.9 |
| 2 | 5000 | 2.03 | 37 | 184 | 84 | 2.7 |
| 3 | 8600 | 1.93 | 34 | 179 | 91 | 10.9 |
| 4 | 13000 | 1.87 | 38 | 275 | 93 | 13.7 |

Note
The polyoxyethylene glycol content in the block copolymer was 60% by weight.

As is apparent from the results shown in Table 1, the removal ratios of urea and vitamin B-12 increase with an increase of the molecular weight of polyoxyethylene glycol in spite of the same polyoxyethylene content.

EXAMPLE 2

A block copolymer having a polyoxyethylene glycol content of 50% by weight (the molecular weight of polyoxyethylene glycol was 5000) was prepared in the same manner as described in Example 1, and a hollow fiber membrane was prepared from this copolymer and the permeability test was carried out. The results are shown in Table 2.

TABLE 2

| Sample No. | Polyoxyethylene Glycol Content in Block Copolymer (%) | Reduced Viscosity, $\eta_{sp/c}$ | Thickness (μm) | Inner Diameter (μm) | Urea Removal Ratio (%) | Vitamin B-12 Removal Ratio (%) |
|---|---|---|---|---|---|---|
| 5 | 50 | 1.81 | 23 | 179 | 80 | 1.4 |
| 2* | 60 | 2.03 | 37 | 184 | 84 | 2.7 |

Note
*The same as sample No. 2 in Example 1

From the results shown in Table 2, it will be understood that the solute removal ratio increases with an increase of the polyoxyethylene glycol content in the block copolymer.

EXAMPLE 3

A block copolymer comprising polyethylene terephthalate having a water absorption of 0.08% by weight as the hydrophobic polymer component was prepared according to the customary ester exchange polymerization method in the same manner as described in paragraph (a) of Example 1, except that ethylene glycol was used instead of 1,4-butane diol. The molecular weight of the polyoxyethylene glycol used was 5000, and the polyoxyethylene glycol content in the block copolymer was 50% by weight.

The reduced viscosity $\eta$ sp/c of the block copolymer was increased to 1.86 by the solid phase polymerization. The block copolymer was melt-spun into a hollow fiber membrane having a thickness of 30 μm and an inner diameter of 180 μm. A module was fabricated from this hollow fiber membrane in the same manner as described in Example 1, and the steam autoclaving sterilization resistance of the dialytic activity was examined. The removal ratio was determined in the same manner as described in Example 1. The water permeability was determined by throttling the liquid discharge side circuit of the module to compress the liquid, and measuring the amount of water squeezed out. The ultrafiltration pressure was 100 mmHg. The results are shown in Table 3.

TABLE 3

| Sample No. | Autoclave Treatment | Urea Removal Ratio (%) | Vitamin B-12 Removal Ratio (%) | Water Permeability (ml/hr·m$^2$·mmHg) |
|---|---|---|---|---|
| 6 | Not treated | 64 | 6.1 | 2.1 |
| 6' | 121° C. × 20 minutes | 70 | 5.0 | 2.3 |

From the results shown in Table 3, it is seen that the autoclave treatment conditions shown in Table 3 have no influences on the properties of the membrane and hence, a dialyzer fabricated by using the hollow fiber membrane of the present invention can be sterilized in an steam autoclave.

Comparative Example 1

According to the process of Lyman et al disclosed in Biochemistry, Vol. 3, No. 7, July 1964, a block copolymer having a polyoxyethylene content of 70.7% by weight (the molecular weight of polyoxyethylene was 1540), which is taught to have a high permeability, was prepared and melt-spun. However, since the melt viscosity was too low, formation of a hollow fiber was not smoothly performed. Accordingly, the molecular weight of the block copolymer was increased by the solid phase polymerization. When the block copolymer was melt-spun, fibers extruded from the spinneret adhered to one another at the winding step and no practical hollow fiber membrane could be obtained. It is considered that the reason for this is that the rate of solidification at the cooling step was slow and the fibers were wound in the amorphous state retaining an adhesiveness.

EXAMPLE 4

The complement consumption ratio of sample No. 2 of Example 1 was measured. For comparison, sample E of a caprolactam-polyethylene glycol-polyacyl lactam block terpolymer disclosed in Example III of Japanese Unexamined Patent Publication No. 54-162898 and a hollow fiber of this block copolymer were prepared according to the procedures disclosed in Example III of said patent publication. The complement consumption ratio of this hollow fiber was similarly measured. The measurement of the complement consumption ratio was carried out in the following manner.

The sample was put into a commercially available standard serum of a guinea pig so that the surface area of the sample was 80 cm$^2$ per ml of the serum. The complement value in the serum was determined as a 50% hemolysis complement value (CH50) according to the method of Meyer et al (see Experimental Immunochemistry, page 133, Thomas, 1961). The reduction of the complement value from the value of the blank was expressed as the complement consumption ratio. The results are shown in Table 4.

TABLE 4

| Sample | Polyoxyethylene | | CH50 (%) |
|---|---|---|---|
| | Molecular weight of polyoxyethylene glycol | Content of polyoxyethylglycol (%) | |
| PBT/PEG* | 5000 | 60 | 5 |
| Lactam/PEG/acyl lactam** | 3000 | 50 | 24 |

Note
*Same as sample No. 2 in Example 1
PBT: polybutylene terephthalate
PEG: polyoxyethylene glycol
**Sample E in Example III of European Patent Publication No. 6030

As is apparent from Table 4, the complement consumption ratio, which is a factor indicating the complement-activating property, of the block copolymer of the present invention is low, i.e., 5%. Namely, the block copolymer of the present invention has little or no complement-activating property. On the other hand, the complement consumption ratio of sample E is 24% and thus sample E considerably activates the complement.

EXAMPLE 5

A block copolymer comprising polyethylene terephthalate having a water absorption of 0.08% by weight as the hydrophobic polymer component was prepared according to the customary ester exchange polymerization method in the same manner as described in paragraph (a) of Example 1, except that ethylene glycol was used instead of 1,4-butanediol. The molecular weight of the polyoxyethylene glycol used was 5000 and the polyoxyethylene glycol content was 60% by weight. The reduced viscosity of the block copolymer was increased to 2.31 by the solid phase polymerization. The block copolymer was melt-spun to obtain a hollow fiber membrane having a thickness of 35 μm and an inner diameter of 210 μm. A blood dialyzer having a membrane area of 0.5 m$^2$ was fabricated by using the thus-formed hollow fiber and an ordinary dialyzer housing having liquid inlet and outlet. Circulation of the blood of a dog outside the body was carried out for 3 hours by using this blood dialyzer and the adhesion of platelets to the membrane surface was examined. Similar tests were conducted on the same dog after the passage of two weeks by using a cuprammonium rayon hollow fiber and after the passage of another two weeks by using a polymethyl methacrylate hollow fiber. In the case of the cuprammonium rayon follow fiber, the platelets were subjected to pseudopodium deformity and were aggregated. In the case of the polymethylmethacrylate fiber, the platelets were subjected to pseudopodium deformity and most of the platelets were deformed beyond recognition. In contrast, in the case of the hollow fiber membrane of the present invention, pseudopodium deformity of the platelets adhering to the membrane surface was observed only to a very slight extent and the degree of deformation of the platelets was much smaller than in the two comparative hollow fiber membranes.

We claim

1. A hollow fiber membrane for dialysis of blood, which is formed by a process consisting of the step of melt-spinning a block copolymer having a reduced viscosity of 1.5 to 4.0, said block copolymer consisting of 30 to 60% by weight of an aromatic polyester having a water absorption up to 1% by weight and 40 to 70% by weight of a polyoxyethylene compound having a number average molecular weight of 3000 to 20000, said polyoxyethylene compound being selected from the group consisting of polyoxyethylene glycol, polyoxyethylene diamine, polyoxyethylene dicarboxylic acid and derivatives of said polyoxyethylene compound in which parts of the ethylene chains are substituted by propylene or tetramethylene.

2. A hollow fiber membrane for dialysis of blood according to claim 1, wherein the aromatic polyester is polybutylene terephthalate.

3. A hollow fiber membrane for dialysis of blood according to claim 1, wherein the aromatic polyester is polyethylene terephthalate.

4. A hollow fiber membrane for dialysis of blood according to claim 1, wherein said block copolymer consists of said aromatic polyester and polyoxyethylene glycol.

5. A hollow fiber membrane for the dialysis of blood according to claim 1, wherein the block copolymer is a block copolymer of polybutylene terephthalate and said polyoxyethylene compound.

6. A hollow fiber membrane for dialysis of blood according to claim 1, wherein the block copolymer is a block copolymer of polyethylene terephthalate and said polyoxyethylene compound.

* * * * *